United States Patent [19]

Sink

[11] Patent Number: 5,051,685
[45] Date of Patent: Sep. 24, 1991

[54] WAVEFORM CORRECTOR

[75] Inventor: John D. Sink, Yorba Linda, Calif.

[73] Assignee: MagneTek, Inc., Los Angeles, Calif.

[21] Appl. No.: 570,823

[22] Filed: Aug. 22, 1990

[51] Int. Cl.⁵ .............................................. G05F 1/70
[52] U.S. Cl. .................................. 323/208; 323/263; 333/167
[58] Field of Search ............... 323/205, 206, 207, 208, 323/259, 263, 301; 307/146, 147; 333/33, 166, 167, 168, 172, 176

[56] References Cited

U.S. PATENT DOCUMENTS

| 4,057,737 | 11/1977 | Rasquin | 307/147 |
| 4,204,129 | 5/1980 | Hutchins, Jr. | 307/146 |
| 4,554,504 | 11/1985 | Dillon | 323/356 |
| 4,725,739 | 2/1988 | McCartney et al. | 333/167 |
| 4,950,916 | 8/1990 | Moran | 323/210 |

Primary Examiner—Peter S. Wong
Attorney, Agent, or Firm—Faegre & Benson

[57] ABSTRACT

A waveform corrector for providing correction to three-phase electrical power to correct for transient and harmonic distortion arising from electrical power cable reactance wherein the cable head end voltage and current are sensed without load end voltage or current sensing. Phase and neutral current values are sensed and corrected with predetermined values of cable resistance and inductance to provide a corrected sine wave voltage at the load end of the cable achieved by inserting a dynamic correction voltage in series with the electrical output of the waveform corrector.

19 Claims, 5 Drawing Sheets

WAVEFORM CORRECTOR

BACKGROUND OF THE INVENTION

This invention relates to the field of power conditioners, particularly for providing three-phase electrical power to loads which may have both transient and harmonic aspects which, if uncorrected, would induce voltage distortion in power supplied to the load. Such loads may include, for example, military aircraft, particularly those in shipboard duty. The growth in size and complexity of aircraft electrical power loads has outpaced capabilities of previously existing line voltage regulators. In addition, it has been found necessary to comply with differing military power specifications and aircraft service cable limitations.

The waveform corrector of the present invention responds to these increased performance demands by correcting distortion in the waveform at a load end of a cable, more particularly by compensating for a voltage distortion caused by the cable impedance and harmonic loads.

DETAILED DESCRIPTION

Figure 1:
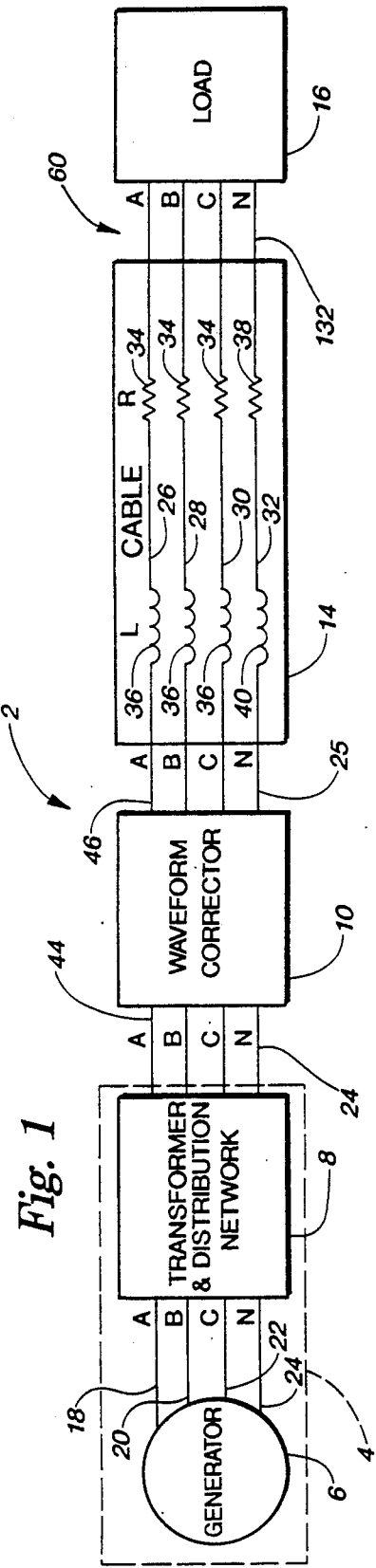
FIG. 1 is a block diagram of a system utilizing the waveform corrector of the present invention and including a generator, a transformer and distribution network, a cable and a load.
Figure 2:
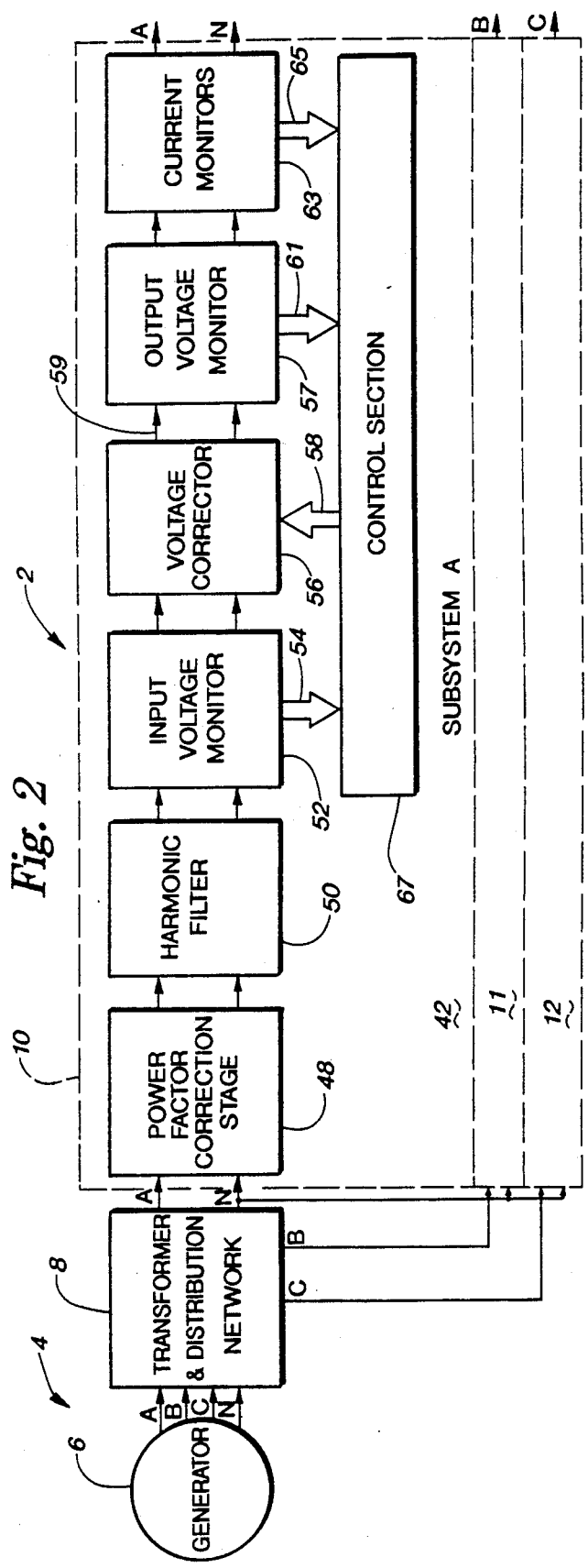
FIG. 2 is a more detailed block diagram of a subsystem A for one phase of the waveform corrector of the present invention.

Referring now to FIG. 1, an overall block diagram of the system 2 may be seen. System 2 includes, generally, a power source 4, made up of a generator 6 and a transformer and distribution network 8. System 2 further includes a waveform corrector 10, a cable 14 and an electrical load 16. As indicated, each component of the system is typically, although not necessarily three-phase, utilizing a four-wire system, having phases A 18, B 20, and C 22. A neutral line N 24 completes the power transmission path from source 4 through waveform corrector 10 and cable 14 to load 16. One example cable is an aircraft power type CVSF4. Such a cable has a three 53 MCM current-carrying conductors 26, 28, 30 to carry the power for phases A, B and C, and further includes a 33 MCM conductor 32 for neutral line 24. This particular cable is 100 feet long and has approximately 0.018 ohm resistance 34 and approximately 0.018 ohm inductive reactance 36 at 400 Hz in each of the current-carrying phases. Neutral line 24 has a resistance 38 of approximately 0.029 ohms and an inductive reactance 40 of 0.018 ohms at 400 Hz. It is to be understood that the line-to-neutral inductance of cable 14 may be unsymmetrical when neutral conductor 32 is not centered, as is the case with CVSF4 type cable. Waveform corrector 10 preferably has identical line power conditioning subsystems for each phase, with the block diagram for one such subsystem 42 (for phase A) shown in FIG. 2. It is to be understood that phase B and C subsystems 11, 12 are preferably identical to subsystem A 42 except for neutral current sensing and compensation, and the phase lock 122 and sine reference 86 (see FIG. 3). Voltage generator 6 is preferably a standard solid state or rotating source of 400 Hz power.

Voltage generator 6 preferably provides a three-phase sine-wave voltage to a transformer and distribution network 8 which transforms the voltage level and distributes power to one or more waveform correctors 10 connected to power source 4. Subsystem 42 preferably includes a power factor correction stage 48, a harmonic filter stage 50 and input voltage monitor stage 52 having an output 54. Subsystem 42 also preferably includes a voltage correction stage 56 having a correction input 58. Stage 56 adds a dynamic voltage at output 59 which is substantially equal in magnitude and opposite in polarity to the voltage drop across cable 14 connected source to load 16 such that the voltage at the load end 60 of cable 14 is maintained substantially as a sine-wave in response to changes in load 16 and in the event that load 16 induces harmonic currents in cable 14. Subsystem 42 also preferably includes an output voltage monitor stage 57 having an output 61, a current monitors stage 63 having an output 65 and a control section 67.

Figure 3:
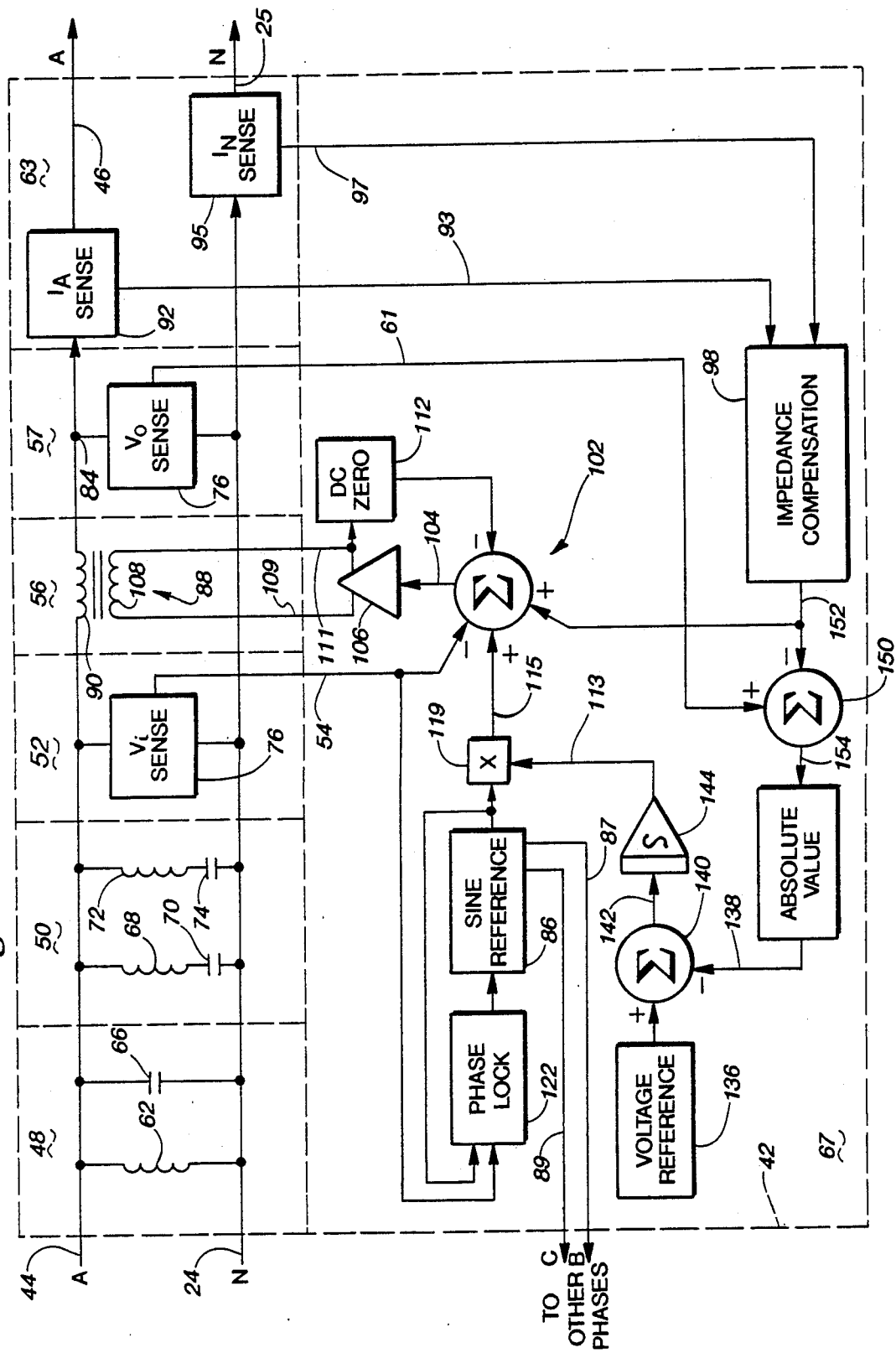
FIG. 3 is a combined block diagram and schematic showing various details of subsystem A of FIG. 2.

Referring now also to FIG. 3, more detailed aspects of the present invention may be seen.

In the power factor correction stage 48, a 1.05 mH inductor 62 is connected in shunt between lines 44 for phase A and neutral line 24. A 50 mf capacitor 66 is connected in shunt between lines 52 and 24.

Inductor 62 in the power factor correction stage 48 circulates the current from capacitors 66, 70, and 74 to bring the no-load power factor to unity.

Capacitor 66 in power factor correction stage 48 circulates upper harmonic currents from load 16 to prevent such currents from passing through to the power source 4.

Harmonic filter stage or circuit 50 includes a 2 KHz trap made up of a 127 mH inductor 68 and a 50 mf capacitor 70. Circuit 50 also includes a 2.8 KHz trap made up of a 65 mH inductor 72 and a 50 mf capacitor 74. Each of these traps is a series tuned L-C filter designed to be operative at the fifth and seventh harmonics, respectively for a 400 Hz fundamental power supply system. Each trap provides a very low impedance path for its respective harmonic current from the load 16. It is to be understood that modern aircraft loads to which this invention is principally directed characteristically have substantial fifth and seventh harmonic currents. It has been observed that the fifth and seventh harmonics are the most severe in rectifier loads on military aircrafts. Higher harmonic currents are filtered by capacitor 66.

Input voltage monitor stage 52 preferably includes a first voltage sensor 76 which may be a transformer preferably having a 20:1 step-down turns ratio with a primary (not shown) connected between lines 44 and 24, and a secondary (not shown) connected to provide a single-ended output on line 54. Alternatively, a voltage divider may be used as sensor 76 to provide output 54 which would then be referenced to neutral 24.

Voltage correction stage 56 preferably includes a buck-boost transformer 88 having a secondary 90 connected in series between line 44 and node 84. A primary 108 of transformer 88 is preferably connected to and driven by control section 67 through lines 101, 103, which together comprise correction input 58. Transformer 88 is preferably an 8:1 primary to secondary type step down transformer. It is to be understood that full load current in phase A is carried by secondary 90. Transformer 88 and its drive circuitry is preferably sized to handle substantially less than full load power available from the waveform corrector 10, preferably in the range of fifteen percent of full load power. This is possible because the transformer 88 only needs to operate with a secondary voltage equal to the difference between the input voltage between lines 44 and 24 and the load voltage between lines 60 and 24.

Output voltage monitor stage 57 is preferably the same as stage 52 and includes a second voltage sensor 80 which may be a transformer also having a 20:1 turns ratio with a primary (not shown) connected between a node 84 and line 24. Output voltage sense transformer or voltage divider 76 provide voltage sensing for the voltage on the output or load side of stage 56 and provides an average voltage feedback signal to control section 67.

Current monitors stage 63 preferably includes a first current sensor 92 which may be a current transformer (not shown) preferably having a 1,000:1 turns ratio to step up a voltage across the primary winding (not shown) connected between node 84 and line 46 in order to provide a useful signal across a secondary winding (not shown) used to provide a single-ended signal representative of phase A current on line 93.

A second current sensor 95 is also preferably part of stage 63 and may be identical to sensor 92, having an output 97. Alternatively, one or both of sensors 92, 95 may comprise another type of current sensor such as a hall-effect current transducer or a shunt with opto-isolation for an output signal whose voltage is proportional to current. It is to be understood that the signals on lines 93 and 95 together make up output signal 65 from stage 63 and are preferably proportional to phase and neutral current respectively.

Control section 67 includes an error-correction summing junction 102 which provides an error signal on lead 104 to a power amplifier 106. Amplifier 106 preferably drives primary 108 of transformer 88 through lines 109, 111 which together comprise correction input 58. A DC zero block 112 provides for bias correction of power amplifier 106 to insure that no DC current flows in winding 108. Each of the voltage signals on lines 54, 61 is preferably filtered to eliminate noise. Control section 67 also includes a phase lock regulator 122 for sine wave reference 86 which preferably provides a three phase output. The entire waveform is preferably sampled so that the sine wave reference 86 will not be affected by transients near zero crossings of the three-phase power. Other outputs of the three-phase phase-locked sine wave reference are preferably supplied to the controls for phases B and C on lines 87 and 89. A multiplier 119 receives the sine reference on line 87 and also receives an integrated average voltage error signal on line 113 and provides the product of these signals on line 115.

An average voltage reference 136 is compared with a signal on line 138 by summing junction 140. An error signal 142 is averaged by integrator 144 to provide signal 113.

Summing junction 150 receives and compares the signal on line 61 with an impedance compensation signal 152 and provides an average voltage feedback signal 154. Signal 154 is put through an absolute value circuit 156 to provide the feedback signal on line 138.

The impedance compensation block 98 receives phase and neutral current signals on lines 93, 97 and provides the impedance compensation signal 152 to both summers 102 and 150.

Figure 4:
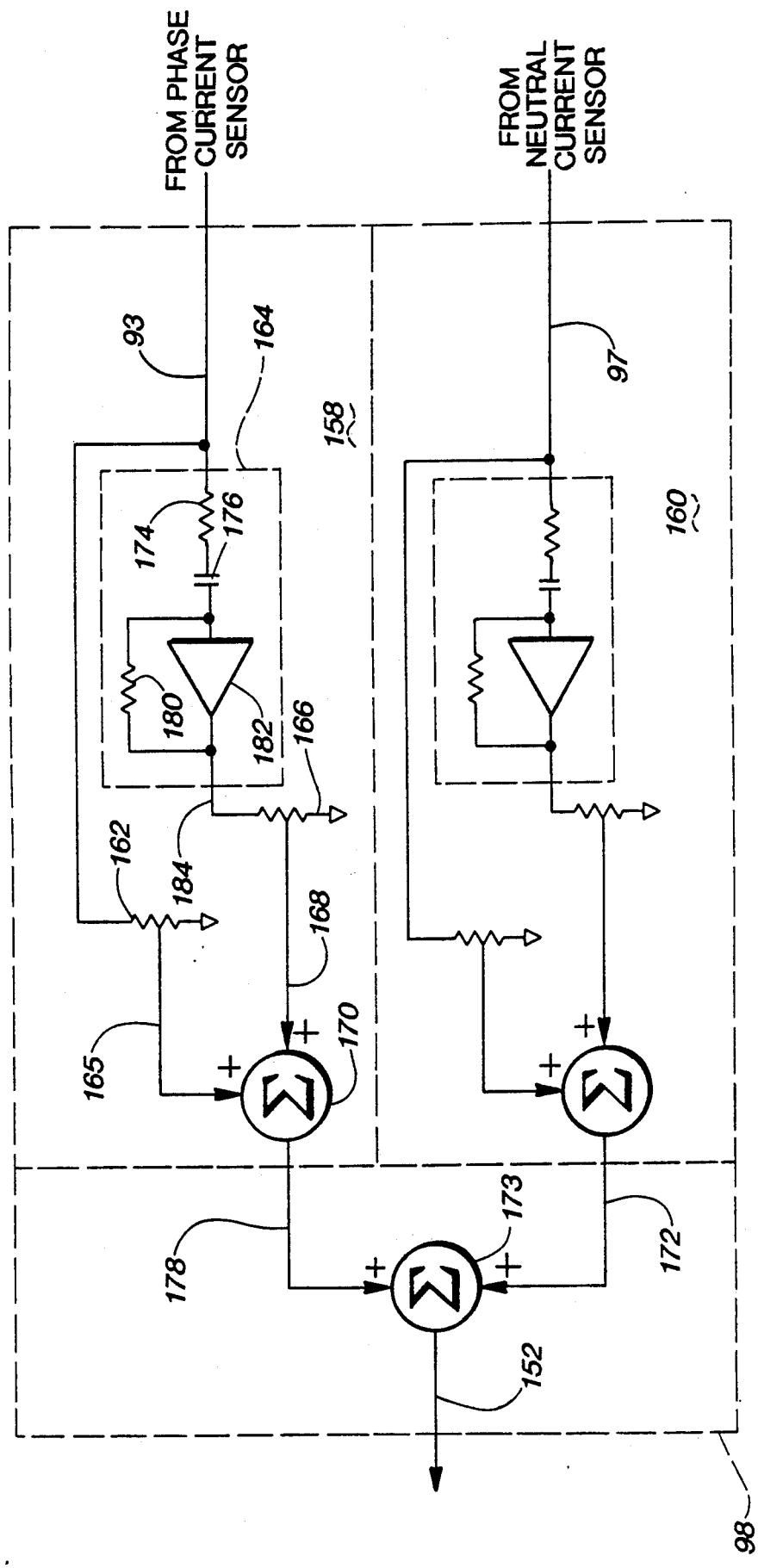
FIG. 4 is a combined block diagram and schematic of the impedance compensation block of FIG. 3.

Referring now also to FIG. 4, details of the impedance compensation block 98 may be seen. Since block 98 is comprised of two identical subsections 158, 160, only one will be described in detail. The phase current signal on line 93 is fed directly to a 10K ohm potentiometer 162 to provide an IR compensation component 165. The phase current signal 93 is also fed through a differentiator 165 to a 10K ohm potentiometer 166 to provide A-L di/dt compensation component 168. Components 165 and 168 are combined in summing junction 170 to provide a phase compensation signal 178. The phase compensation signal 178 is added to a neutral compensation signal 172 in summing junction 173 to provide the impedance compensation signal 152.

Differentiator 164 is preferably formed of a 39 ohm resistor 174, a 0.1 mf capacitor 176, a 5K ohm resistor 180 and a conventional operational amplifier 182. If desired, a 330 pf capacitor (not shown) may be placed in parallel with resistor 180 to reduce noise in differentiator output 184.

Referring now also to FIG. 3, in operation, the error voltage on line 104 is used to compensate the voltage between line 46 and neutral line 25 at the output of the waveform corrector by driving amplifier 106 to provide a voltage across winding 90 proportional to the voltage drop in cable 14 which is due both to harmonic currents and to transient and steady state loading by load 16. It is to be understood that even though the voltage and current sensing is at the source end 18 of cable 14, the voltage distortion is corrected by stage 56 at end 60 of cable 14.

Figure 5:
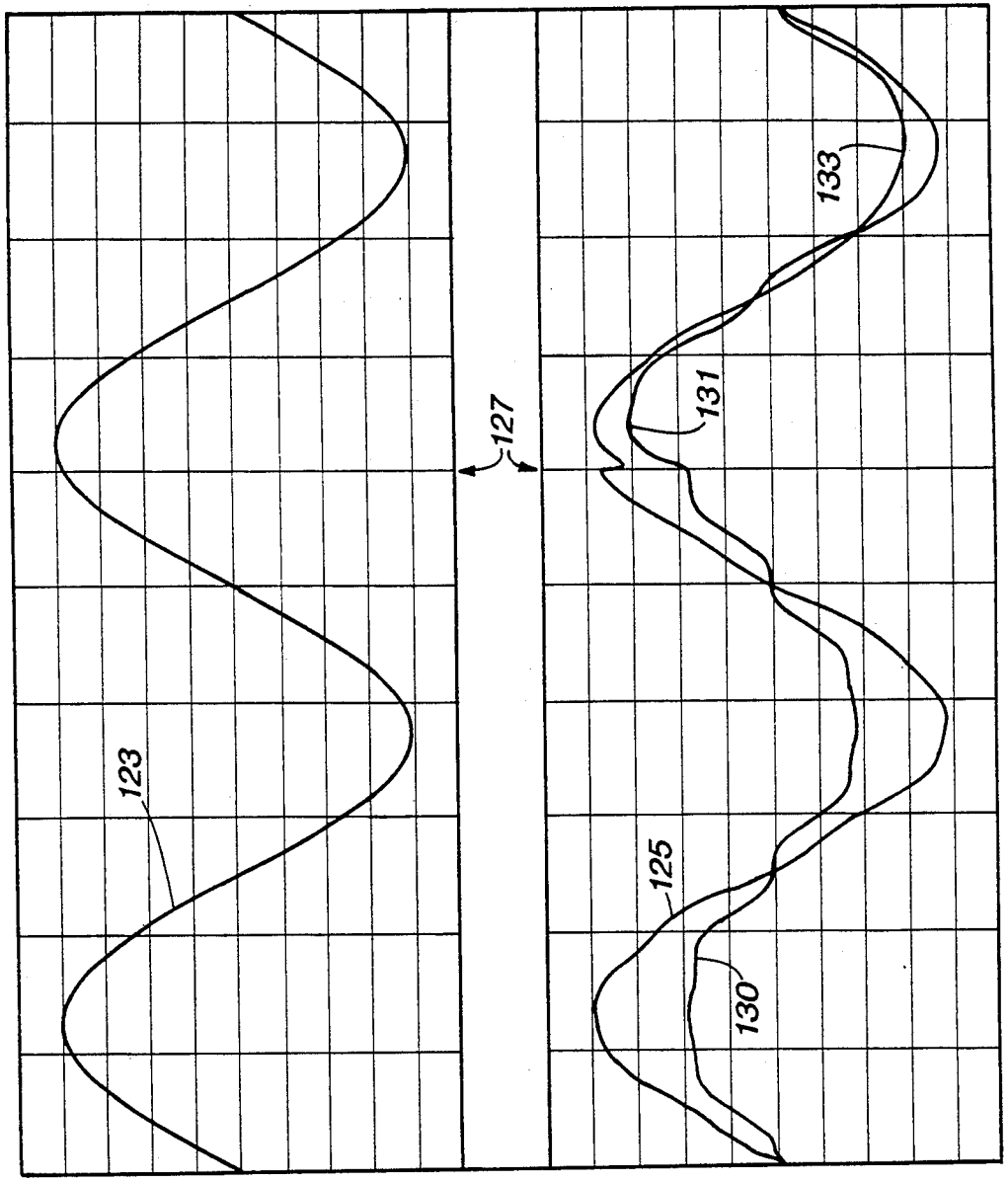
FIG. 5 is a set of waveforms illustrating the operation and performance of a system similar to FIG. 1 but without the present invention.
Figure 6:
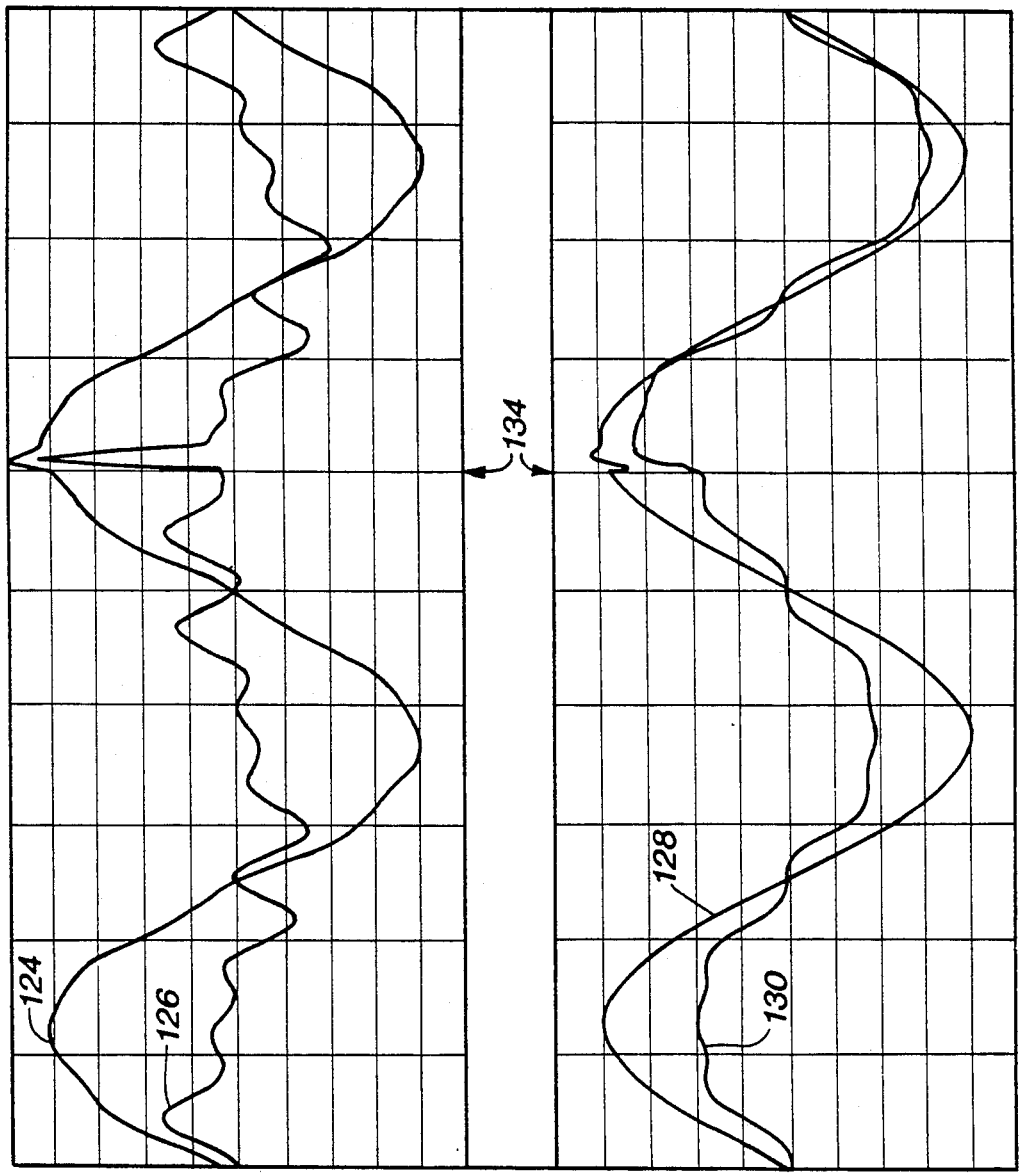
FIG. 6 is a set of waveforms illustrating the operation and performance of the system of FIG. 1 with the present invention.

Referring now to FIGS. 5 and 6, waveforms indicative of the performance of this invention may be seen. It is to be understood that waveforms of FIGS. 5 and 6 are those of a simulation but are believed to closely correlate to actual waveforms.

Waveform 123 represents the voltage at a source end 121 of cable 14 in a system without the present invention. Waveform 125 represents the voltage at a load end 132 of cable 14 without the present invention when a load current represented by waveform 130 is present having harmonic components. At point 127 a load increase is applied, causing a transient condition in waveform 125. As may be seen in waveform 130, the load current is increased after point 127 evidenced by the increase in the positive and negative peak load currents 131, 133.

Waveform 124 is representative of the cable source-end voltage at line 46 with respect to neutral line 25 (see FIG. 1) using the present invention. Waveform 126 represents the voltage across winding 90. Waveform 128 shows the voltage from line 60 to a load end 132 of neutral line 24. Waveform 130 represents load current in line 26.

At point 134 a step load change is introduced, causing the perturbations shown in each of the waveforms.

Waveform 125 may be seen to include substantial distortion. Because one military specification requires that distortion be no greater than three percent for any single harmonic, waveform 124 would be unacceptable (see FIG. 3 of MIL-STD-704, incorporated by reference, for one military standard voltage distortion spectrum). Furthermore, voltage regulation and transient load response for such applications must meet MIL-STD-704 Table 1 and its FIG. 5. The present invention is capable of meeting the requirements of such military standards as indicated by waveform 128 when system 2 is required to provide a load current such as that shown by waveform 130. It is important to note that the present invention operates without requiring any voltage or current or other sensing at load end 60 of cable 14.

The invention is not to be taken as limited to all of the details thereof as modifications and variations thereof may be made without departing from the spirit or scope of the invention. For example, the present invention may be adapted to operate in a single phase system or in a three-phase, three-wire system with an appropriate control circuit common reference point as is well known in the art.

What is claimed is:

1. In an electrical power system of the type providing AC voltage from a supply network to a load through a cable having a predetermined complex impedance, the improvement in combination therewith comprising:
   (a) monitoring means for monitoring current at a head end of cable; and
   (b) control means responsive to said monitoring means for adjusting a waveform of the AC voltage at said head end by an amount corresponding to a real-time product of the complex impedance and the current such that the waveform of voltage at a load end of the cable is substantially a sine wave.

2. The power system improvement of claim 1 wherein the monitoring means comprises a current transformer.

3. The power system improvement of claim 1 wherein the monitoring means comprises a hall-effect transducer.

4. The power system improvement of claim 1 wherein the control means comprises a transformer having a winding connected in series with the cable.

5. The power system improvement of claim 1 further comprising a harmonic filter circuit for preventing harmonics from entering the supply network.

6. A method of correcting distortion induced by a complex impedance of a cable connecting an AC voltage to a non-linear load comprising the steps of:
   (a) predetermining the total impedance of the cable between a head end and a load end of the cable;
   (b) monitoring an output current supplied through the cable to the load to develop an output current signal proportional to output current;
   (c) multiplying the output current signal by the total impedance determined in step (a) to develop a correction signal;
   (d) amplifying the correction signal and adding the amplified correction signal to an AC voltage output at the head end of the cable such that the voltage at the load end of the cable is substantially a sine wave during load variations.

7. The method of claim 6 wherein step (b) further comprises using a current transformer for monitoring output current from the source.

8. The method of claim 6 wherein step (b) further comprises using a hall-effect transducer for monitoring output current from the source.

9. The method of claim 6 wherein step (d) further comprises using a series connected transformer for adding the amplified correction signal to the AC voltage output.

10. The method of claim 6 further comprising the step:
   (e) filtering harmonics from the output current.

11. An improved waveform corrector for correcting distortion in electrical power caused by cable impedance and harmonic loads comprising:
   (a) an input line and a neutral line for receiving AC power from a generation and distribution network;
   (b) a power factor correction stage connected to the input line and the neutral line and having a power factor correction stage output;
   (c) a harmonic filter circuit connected between the power factor correction stage output and the neutral line; and
   (d) a voltage correction stage connected in series with the power factor correction stage output and having an output wherein the voltage correction stage adds a dynamic voltage at the voltage correction circuit output substantially equal in magnitude and opposite in polarity to a harmonic and transient voltage drops across a cable connected between the power conditioner and a load such that the voltage at a load end of the cable is maintained substantially as a sine wave.

12. The waveform corrector of claim 11 wherein the voltage correction circuit comprises multiplier means for multiplying a signal proportional to a current in the cable by a predetermined complex impedance of the cable to produce the dynamic correction voltage.

13. The waveform corrector of claim 12 wherein the impedance of the cable comprises a resistive portion and an inductive portion.

14. The waveform corrector of claim 11 wherein the power factor correction stage comprises a capacitor connected between the power factor correction stage output and the neutral line.

15. The waveform corrector of claim 14 wherein the power factor correction stage further comprises an inductor connected between the input line and the neutral line.

16. The waveform corrector of claim 11 wherein the voltage correction stage comprises a step-down transformer having (i) a secondary connected in series with the power factor correction stage output and, (ii) a primary receiving a differential input proportional to the cable voltage drop.

17. The waveform corrector of claim 16 wherein the voltage correction stage further comprises a current-sensing transformer means for sensing and providing a signal proportional to electrical current in the cable and connected in series between the step-down transformer secondary and the voltage correction stage output.

18. The waveform corrector of claim 17 wherein the voltage correction stage further comprises (i) a first voltage sensing transformer having a primary connected between the power factor correction stage output and the neutral line, and having a secondary for providing a signal proportional to a voltage at the power factor correction stage output, and ii) a second voltage sensing transformer having a primary connected at a first end thereof to a junction between the step-down transformer and the current-sensing transformer means and at a second end thereof to the neutral line and having a secondary for providing a feedback signal for a dynamic voltage correction control loop.

19. The waveform corrector of claim 18 wherein the dynamic voltage correction control loop comprises a summing junction means for dynamically correcting voltage distortion at the load end of the cable.

* * * * *